Figure 1:
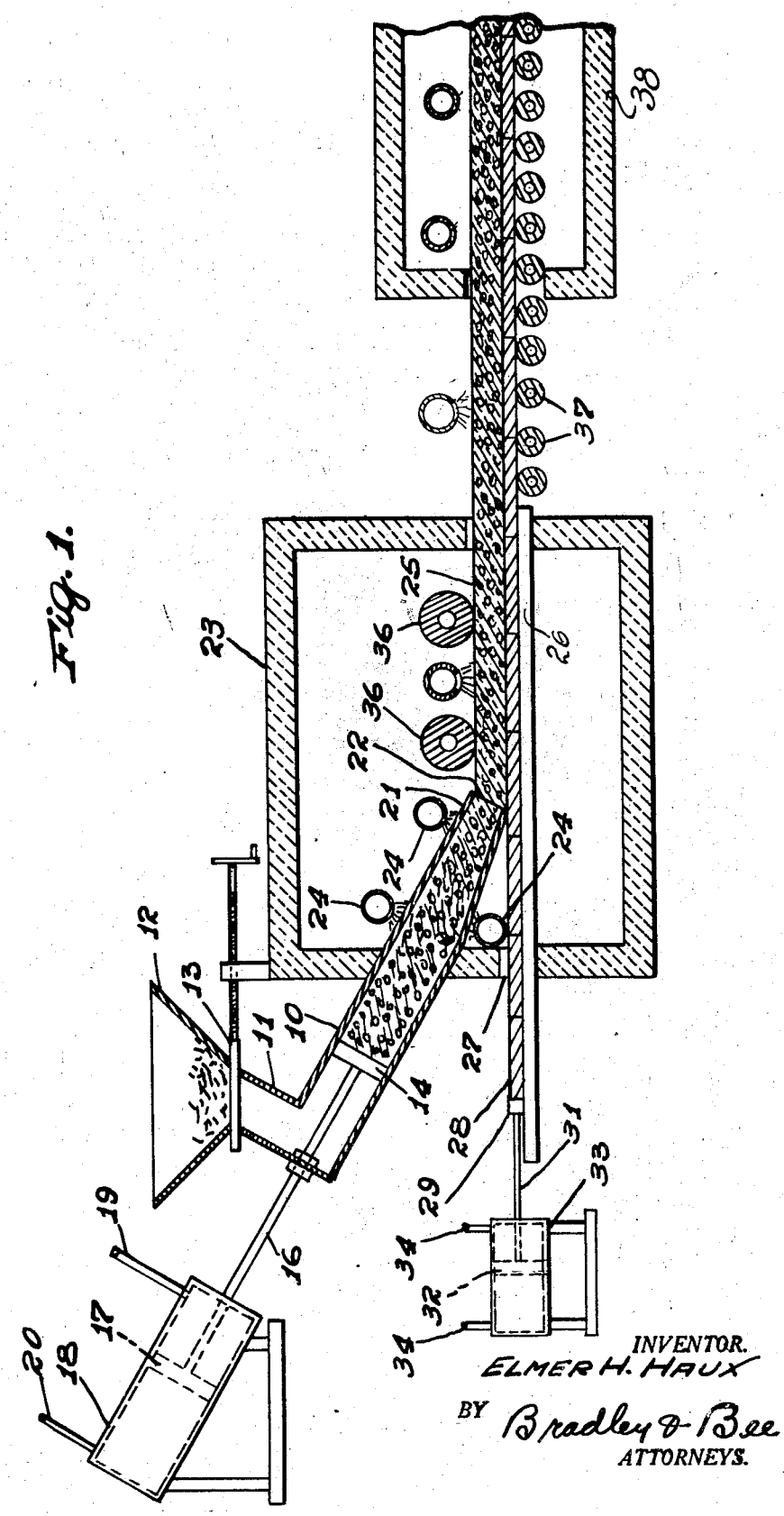

Feb. 27, 1940.　　　E. H. HAUX　　　2,191,658
METHOD OF PREPARING CELLULAR MATERIALS
Filed Jan. 22, 1938　　　3 Sheets-Sheet 1

INVENTOR.
ELMER H. HAUX
BY Bradley & Bee
ATTORNEYS.

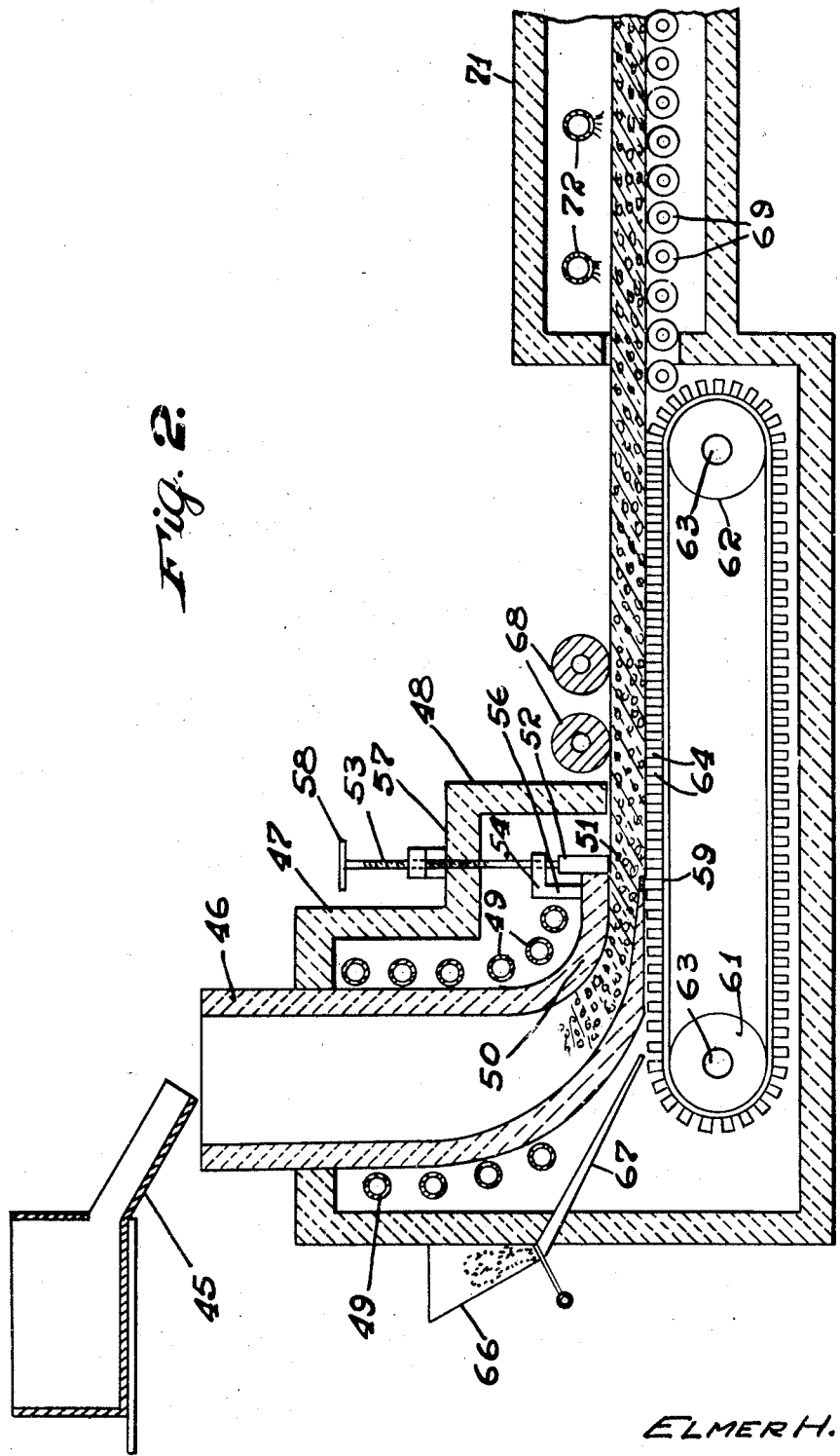

Feb. 27, 1940.　　　　　E. H. HAUX　　　　2,191,658
METHOD OF PREPARING CELLULAR MATERIALS
Filed Jan. 22, 1938　　　3 Sheets-Sheet 3
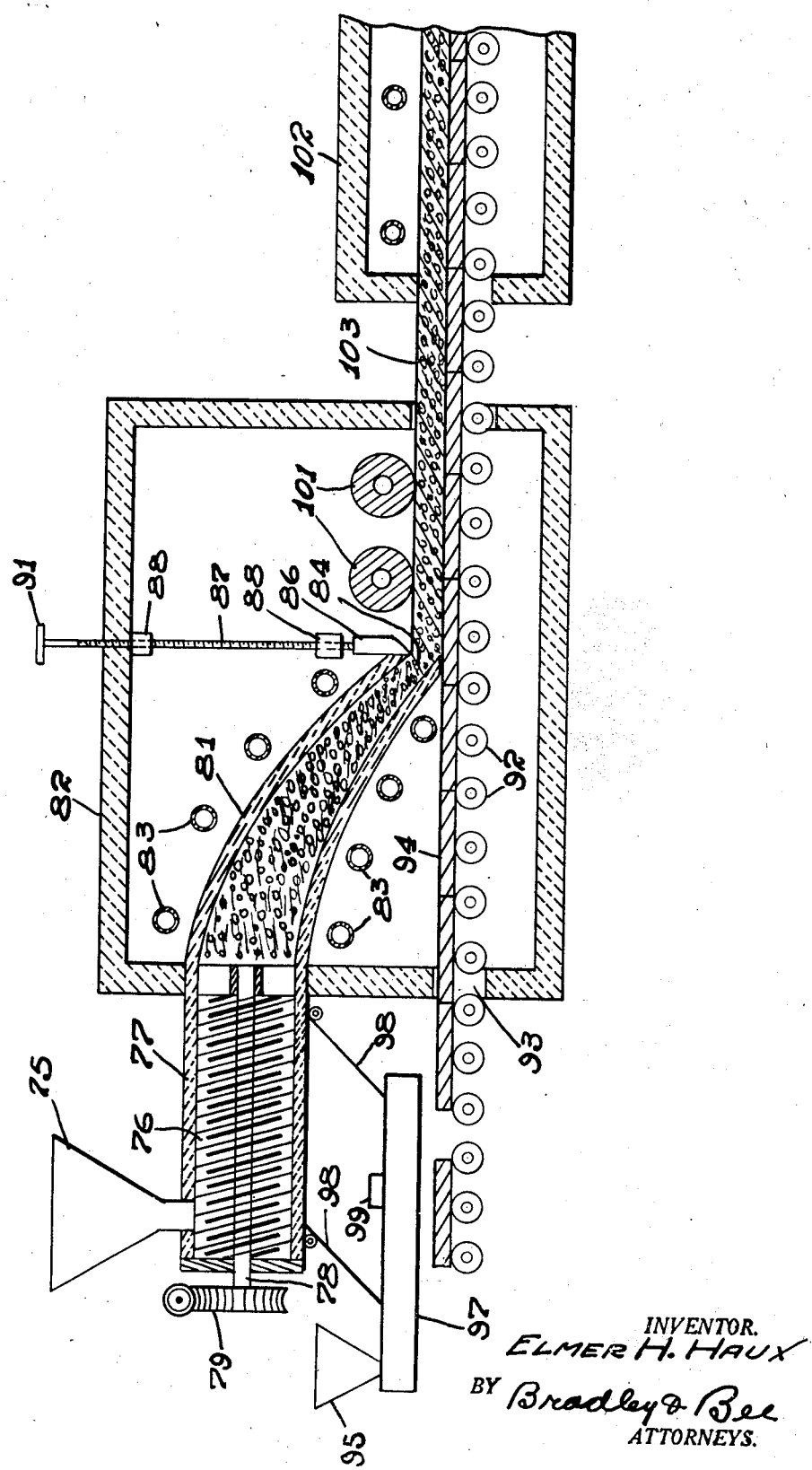
INVENTOR.
ELMER H. HAUX
BY Bradley & Bee
ATTORNEYS.

Patented Feb. 27, 1940

2,191,658

UNITED STATES PATENT OFFICE 2,191,658

METHOD OF PREPARING CELLULAR MATERIALS

Elmer H. Haux, Tarentum, Pa., assignor to Pittsburgh Plate Glass Company, Allegheny County, Pa., a corporation of Pennsylvania Application January 22, 1938, Serial No. 186,328

2 Claims. (Cl. 49—77)

The present invention relates to the manufacture of cellular or porous materials and it has particular relation to the preparation of the cellular material from glass, slag, or similar relatively highly refractory substances which become plastic at elevated temperatures.

One object of the invention is to provide a process of preparing cellular materials from glass, blast furnace slag, or similar refractory materials which is substantially continuous in operation, requires but small expenditure of labor and which results in a relatively uniform product of such character that it may be sawed, nailed, or otherwise manipulated with relative ease.

These and other objects will be apparent from consideration of the following specification and claims.

It has heretofore been proposed to prepare cellular bodies possessing relatively low thermal conductivity and high resistance to decomposition by heat, by introduction of gas cells or bubbles into molten or plastic glass, or blast furnace slag, in order to form a foam-like structure. Conventional methods of forming such materials have involved introduction of a gassing material such as charcoal or the like into molten glass where by reason of heat and chemical reaction, relatively large volumes of gas were generated to convert the molten material into bubbly structure. It has also been proposed to subject portions of molten glass in suitable molds to evacuation, to liberate the gases absorbed therein as bubbles, which upon chilling of the mass provide a permanent cellular structure. These methods as heretofore conducted were objectionable because they were intermittent in character. Also, the introduction of the gassing material into molten glass usually resulted in a mere glassy, vitreous body having bubbles incorporated therein. Such materials were objectionable because there was relatively poor distribution of the bubbles and because they could not be readily cut or nailed.

According to the provisions of the present invention the foregoing difficulties are reduced or substantially eliminated by heating a mixture of ground or crushed glass, slag, or other suitable vitreous but thermoplastic material and a gassing agent such as calcium carbonate to a temperature above that of decomposition of the gassing agent, such temperature being above that of incipient fusion of vitreous material. The resultant foamy mass is caused to flow through a suitable orifice upon a conveyor or table which is caused to move at suitable rate with respect to the orifice.

Embodiments of apparatus suitable for practicing the present invention are disclosed in the drawings in which Figures 1, 2, and 3 are each vertical cross-sectional views of simplified forms.

In the form of the invention disclosed in Figure 1 a tubular rearwardly and upwardly inclined extruding chamber 10 of suitable cross-sectional contour is provided at its upper extremity with an upwardly directing throat 11 which opens into an open hopper 12 and the passage between the throat and the hopper is closed by means of a slide valve 13. For purposes of assisting the natural gravitation forces acting upon the pulverulent mass of the material in impelling the material through the extruding chamber, a piston or plunger 14 is disposed in the latter and is connected to a piston rod 16 which projects through the rear extremity of the chamber. This piston rod at its rear extremity is provided with a piston 17 which reciprocates in a suitable cylinder 18 and fluid for actuating the piston 17 is admitted to the cylinder by means of conduits 19 and 20. At its lower extremity, the extruding chamber is provided with a nozzle 21 tapering to an orifice of suitable dimensions.

The lower portion of the extruding chamber and nozzle 22 are enclosed in a furnace 23 formed of fire-brick or other refractory material and containing a plurality of burners 24 which may be fed with combustible material for purposes of directing a heating flame upon the exterior of the extruding chamber and nozzle. Of course any other convenient means may be employed for heating the material as it is fed downwardly. For example, it is possible to provide electrical resistance about the chamber and nozzle. It is also possible to provide electrodes for conducting a current of electricity directly through the batch whereby to generate heat in the latter. A stream of cellular material 25 discharging from the nozzle 21 is received upon a support which in the embodiment of apparatus under discussion comprises a suitable flat surface or table 26 which constitutes the bottom of the furnace 23. This table at its rear end projects through an opening 27 in the rear wall of the furnace 23 and supports a series of movable plates 28 formed of fused silica, carborundum or other suitable heat-resistant material. These plates are inserted through the opening 27 and are moved forwardly by means of a suitable ram 29 which is attached to the forward end of a piston rod 31. The latter element in turn is secured at its rearward end to a piston 32 which reciprocates in a cylinder 33. Fluid for actuating the piston is admitted by means of conduits 34. Forming or sizing rollers 36 disposed in advance of nozzle 22 assist in smoothing and shaping the freshly formed plastic sheet.

The plates 28, after they have passed through the furnace 23, are supported upon suitable conveyor rollers 37 which may be driven by suitable means (not shown). A lehr 38 is spaced forwardly from the forward end of the furnace 23 in order to provide a space admitting of the rapid cooling of the cellular structure to the annealing temperature.

It will be manifest that if desired the table 26 and the rollers 37 for supporting the plates 28 may be replaced by a suitable chain conveyor to which the plates 28 may be attached or upon which they may be disposed.

In the operation of this embodiment of the apparatus a mixture of finely divided or powdered glass, slag, or other suitable vitreous material which may be cold or which may be preheated to any temperature (e. g. 1000 or 1200° F.) below the temperature of sintering, and a gassing agent such as calcium carbonate, charcoal, or the like is fed into the hopper 12 while the valve 13 is closed, and the piston 14 is retracted. Glass suitable for the purpose may be of the formula employed in fabricating sheet glass and should be crushed to such size that substantially all will pass a 28 mesh screen while substantially all will be retained by a screen of 200 mesh per inch. The calcium carbonate is employed in a ratio of 1 or 2 per cent and preferably in a ratio of 1½ per cent.

When the valve 13 is opened and the mixture runs down into the extruding chamber 10 and is then heated to a temperature sufficient to sinter or soften the particles of refractory material and to decompose the gassing agent. Assuming that ordinary sheet glass is crushed to provide the vitreous body, initial sintering will occur at a temperature of about 1350–1400° F. The calcium carbonate will decompose at a temperature of about 1500° F. Preferably the material passing through the nozzle 21 will be at a temperature somewhat above the temperature of decomposition of the calcium carbonate, (e. g. 1600 or 1650° F.) but below the true melting point of the glass. The upper range of temperature seems to be about 1700 or 1750° F. When the material in the chamber 10 reaches the temperature of extrusion it may be sufficiently fluid to flow from the nozzle, by expansion of the incipiently fused mass in the heating chamber or nozzle to form a cellular structure. Such flow may be considered as being due to chemical action within the mass rather than to externally applied mechanical or fluid pressure. Of course considerable frictional resistance is exerted by the pulverized mass in its progress through the chamber. Some resistance may also be set up by the sintering together of the particles of glass just prior to its reaching a temperature at which the calcium carbonate decomposes to provide a flowable cellular mass. This sintered but unexpanded mass is fairly stiff or rigid and a certain amount of force may be required to propel it forward.

Sufficient mechanical or fluid pressure may be exerted upon the mass to overcome these various resistances and thus to obtain adequate rate of movement of the material. However, the process does not depend for operability upon change or release of pressure upon a sintered mass containing a gas in order to induce expansion to cellular form.

The mass as it leaves the nozzle 21 is received upon the plates 28 which are actuated forwardly at a uniform rate, e. g. 3 or 4 inches per minute by means of the plunger 29. The cellular material upon the plates 28 after leaving the furnace is quickly cooled approximately to the annealing temperature of about 1100° F. in the space between the furnace and the lehr. After reaching the annealing temperature the sheet is carried forwardly through the lehr and is subjected to gradual cooling until the internal strains in the mass have been sufficiently reduced to obtain stability.

The cellular sheet after annealing and cooling is found to comprise a foam-like structure which has been expanded to approximately 7 to 10 times the volume of the original pulverized material fed into the hopper 12. It is substantially opaque though usually of white or light color. Apparently it is composed of a bubbly mass, the cell walls of which are composed of relatively fine particles of glass which are partially but not completely fused together. It is distinguished from mere bubbly sheet glass because it can be sawed, ground or nailed with ease, without any tendency to shatter.

In the form of the invention disclosed in Figure 2, batch material comprising pulverized glass or slag and a small percentage of gassing agent such as calcium carbonate is fed by means of a chute 45 into a columnar chamber 46 which may be formed of fire-brick, or other refractory material, or heat-resisting steel. The lower portion of the chamber is disposed in vertical portion 47 of a furnace 48 and is heated by suitable means, for example, by means of gas burners 49 disposed at suitable intervals thereabout. It will be manifest that the gas burners may be replaced by electrical heating elements or if preferred electrodes may be projected into the material in the chamber and a current of electricity conducted through the batch itself in order to heat the latter. The chamber 46 at its lower extremity is provided with a forwardly curving portion 50 which terminates in an orifice 51.

The size of this orifice may be regulated, or the orifice may even be entirely closed by means of a slide valve 52 disposed transversely thereof. The valve is swivelly connected to an upwardly-extending adjusting screw 53 which is threaded through a forwardly-projecting flange 54 upon a bracket 56 that projects upwardly from the forwardly-extending portion 50 of the heating chamber. The screw also extends upwardly through a horizontal shelf or ledge 57 in the wall of the furnace 48 and at its upper extremity is provided with a suitable hand wheel 58 by means of which the position of the valve 52 may be manually adjusted.

Means for conveying away the freshly formed sheet of cellular material at a uniform rate comprises a conveyor 59 which is disposed in horizontal position immediately below the orifice 51 and is trained about suitable sprockets or rollers 61 and 62, upon shafts 63. Transversely disposed bars 64 of suitable refractory material such as chromium steel or a refractory ceramic body are disposed upon the conveyor 59 in order to provide a uniform surface suitable for reception of the cellular sheet. In order to prevent lateral spreading of the sheet while it is still plastic side walls may be provided upon these bars, thereby restricting the flow. In some cases the cellular material may exhibit a tendency to adhere to the bars and in order to prevent it means may be provided for sprinkling a thin layer of sand or other refractory pulverulent material upon the surface of the conveyor prior to application of the cellular sheet. Such means may comprise a hopper 66 disposed upon or adjacent to the rear wall of the furnace 48 and communicating with a forwardly-projecting chute 67 that extends through the wall and discharges upon the rear extremity of the conveyor 59.

The freshly formed sheet of cellular material upon the conveyor 59 while it is still plastic may be formed or compressed to uniform thickness by means of one or more sizing rollers 68 which in the embodiment of the invention herein illustrated are disposed immediately in advance of the furnace 48. If desired the furnace may also be extended forwardly to enclose these rollers.

A substantial portion of the conveyor 59 extends beyond the forward wall of the furnace 48 thus admitting of rapid cooling of the freshly formed cellular sheet, preferably down approximately to the annealing temperature, which is usually about 1150° F. The sheet after it has become sufficiently hardened upon the conveyor 59 is transferred to a second conveyor system which may comprise a series of rollers 69, some or all of which may be driven by suitable means (not shown). This conveyor extends through a lehr chamber 71, the rear portion of which is heated to desired temperature by means of burners 72. The temperature in this lehr is so graded that the cellular sheet as it passes through the chamber is cooled down during a period of about 3 to 5 hours in such manner that the internal stresses therein are sufficiently relieved to provide a stable body.

In the form of the invention disclosed in Figure 3 batch material is fed from a hopper 75 to a screw conveyor 76 disposed in a tube 77. The shaft 78 of the screw conveyor projects rearwardly from the extremity of the tube 77 and is provided with a worm gear 79, or other suitable driving device which is driven by suitable means (not shown). A nozzle or heating chamber 81 is connected to the forward extremity of the tube 77 to receive the batch material and is disposed in a furnace 82 of convenient design and is heated by means of gas burners 83 disposed at suitable intervals. The nozzle or chamber at its forward extremity terminates in an orifice 84, the cross-sectional area of which may be controlled by means of a slide valve 86 having a vertically-extending operating screw 87 swivelly connected thereto. The screw is threaded through a cross bar 88 in furnace 82 and extends outwardly through the top of the furnace and is provided with a manually operable hand wheel 91 by means of which the screws may be rotated to raise or lower the valve.

Conveying means for removing the extruded material from the orifice 84 at a uniform rate may be of any convenient structure. In the embodiment of the invention illustrated it comprises a series of rollers 92, all or a portion of which are driven by a suitable means (not shown). This conveyor system extends rearwardly through an opening 93 in the rear wall of the furnace 82 and slabs 94 of refractory material are deposited thereon either manually or by suitable mechanical means, at such intervals as to provide a substantially continuous moving surface upon which the cellular material from the orifice 84 is deposited.

The upper surface of the slabs may be dusted or thinly coated with a layer of sand or other pulverulent material in order to obviate any tendency for the cellular sheet to adhere thereto. Means for applying such layer comprises a hopper 95 which is disposed below the screw conveyor 76 and which at its lower extremity discharges into a chute 97. The chute in turn is suspended upon hinged links or flexible springs 98 which are attached to any convenient support for example, the lower portion of the tube 77. Vibratory motion for insuring uniform feed of the material from the chute is secured by means of an electrical vibrator 99 of conventional design.

For purposes of sizing or shaping the sheet of cellular material as it emerges from the nozzle the slabs 94 may be formed or provided with upwardly-extending end and side members (not shown). Driven sizing rollers 101 may also be disposed in the forward portion of the furnace in position to the contact, the upper surface of the freshly formed sheet.

Annealing lehr 102 is disposed forwardly of the furnace 82 in position to receive the freshly formed sheet of cellular material. Preferably the lehr is so spaced from the furnace as to provide an open space 103 across which the cellular sheet must travel and during which travel it is cooled down approximately to the annealing temperature.

Operation of the embodiments of apparatus disclosed in Figures 2 and 3 are essentially the same as that of the form disclosed in Figure 1. The formulation of the batch, the operating temperatures and other factors in each instance are the same. The material is simply fed by mechanical pressure generated by the weight of the material in the chamber 46 or by the screw conveyor 76 into the branch 56 or nozzle 81 and in the latter members after the material has become sufficiently plastic it is extruded upon the continuously moving slats 64 or slabs 94 and after suitable sizing by means of rollers 68 or 101 it is partially cooled and then annealed.

In all instances the mode of operation of the apparatus is exceedingly simple and is either continuous or at least operable over relatively long cycles without interruption.

The embodiment of apparatus herein disclosed are to be considered as being merely illustrative. Obviously numerous modifications may be made therein without departure from the spirit of the invention or the scope of the appended claims.

What I claim is:

1. A method of forming a refractory cellular insulating body which comprises pulverizing a material selected from a class consisting of glass and blast furnace slag so that substantially all of it will pass a screen of about 28 mesh while substantially all of it is retained by a screen of about 200 mesh, admixing the material with about 1 to 2% of calcium carbonate as a gassing agent, then gradually heating the mixture in order first to sinter the particles of pulverized vitreous material together at their points of contact into a coherent mass, then to decompose the calcium carbonate to liberate bubbles of carbon dioxide gas, and finally to a maximum within a range of about 1600 to 1750 degrees F. to soften the material so that the liberated gases can expand to form a light cellular body, and cooling the body.

2. A method of forming a refractory cellular insulating sheet which comprises pulverizing a material selected from a class consisting of glass and blast furnace slag so that substantially all of it will pass a screen of about 28 mesh while substantially all of it is retained by a screen of about 200 mesh, admixing the material with about 1 to 2% of calcium carbonate as a gassing agent, then gradually heating the mixture in order first to sinter the particles of pulverized vitreous material together at their points of contact into a coherent mass, then to decompose the calcium carbonate to liberate bubbles of carbon dioxide gas, and finally to a maximum within a range of about 1600 to 1750 degrees F. to soften the material so that the liberated gases can expand to form a light cellular body, flowing the softened material through an orifice of appropriate size and shape, receiving the material from the orifice upon a moving conveyor to shape the body into a continuous sheet and cooling and annealing the sheet.

ELMER H. HAUX.